US009503141B2

(12) United States Patent
Rhee

(10) Patent No.: US 9,503,141 B2
(45) Date of Patent: Nov. 22, 2016

(54) SOCKET DEVICE

(71) Applicant: Samsung Electronics Co., Ltd., Gyeonggi-do (KR)

(72) Inventor: Bong-Jae Rhee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/596,200

(22) Filed: Jan. 13, 2015

(65) Prior Publication Data

US 2015/0200479 A1  Jul. 16, 2015

(30) Foreign Application Priority Data

Jan. 13, 2014 (KR) .................. 10-2014-0003744

(51) Int. Cl.
*H01R 13/648* (2006.01)
*H04B 1/3816* (2015.01)
*H01R 12/71* (2011.01)

(52) U.S. Cl.
CPC .......... *H04B 1/3816* (2013.01); *H01R 12/714* (2013.01); *H01R 2201/16* (2013.01)

(58) Field of Classification Search
CPC  H01R 12/714; H01R 12/62; H01R 13/2442; H01R 13/405; H01R 13/22; H04B 1/38
USPC .................................. 439/607.35
See application file for complete search history.

(56) References Cited

U.S. PATENT DOCUMENTS

| | | | | |
|---|---|---|---|---|
| 5,488,494 A * | 1/1996 | Redfield | ............ | G03H 1/0404 359/21 |
| 6,974,343 B2 | 12/2005 | Zheng et al. | | |
| 7,320,622 B2 * | 1/2008 | Ying | ............ | H01R 13/22 439/630 |
| 7,357,677 B2 * | 4/2008 | Liu | ............ | G06K 13/08 439/159 |
| 7,503,805 B2 * | 3/2009 | Chang | ............ | H01R 13/2442 200/51.1 |
| 7,628,652 B2 * | 12/2009 | Ting | ............ | H01R 13/405 439/630 |
| 7,775,835 B2 * | 8/2010 | Ting | ............ | H01R 12/62 439/630 |
| 7,802,727 B1 * | 9/2010 | Tsai | ............ | H04B 1/3816 235/375 |
| 8,248,819 B2 | 8/2012 | Wang | | |
| 2004/0214474 A1 * | 10/2004 | Tsai | ............ | H01R 43/0256 439/630 |
| 2007/0293092 A1 * | 12/2007 | Seo | ............ | H04B 1/3816 439/630 |
| 2008/0188133 A1 * | 8/2008 | Lee | ............ | H01R 31/06 439/630 |

(Continued)

FOREIGN PATENT DOCUMENTS

KR   20080106727 A   12/2008
KR   10-2009-0046520   5/2009

OTHER PUBLICATIONS

International Search Report dated Mar. 27, 2015 in connection with International Application No. PCT/KR2015/000043; 3 pages.

(Continued)

*Primary Examiner* — Jean F Duverne

(57) ABSTRACT

A socket device is provided. The socket device includes a substrate, at least one structure, and a socket. The at least one structure is disposed on the substrate, and includes an upper surface. The upper surface includes an opening separated with a predetermined interval from a surface of the substrate. The socket is disposed so that at least a portion of the socket is stacked on an upper portion of the structure. The socket is electrically connected to the substrate via the opening. The number of parts is reduced, so that the number of assembly processes is reduced and assembling is convenient, and manufacturing costs is reduced and slimness of an electronic device is achieved.

18 Claims, 16 Drawing Sheets

(56) References Cited

U.S. PATENT DOCUMENTS

2008/0299829 A1    12/2008  Kim
2009/0111307 A1*    4/2009  Ting .................... H01R 13/405
                                                          439/327
2011/0141709 A1     6/2011  Wang

OTHER PUBLICATIONS

Written Opinion of International Searching Authority dated Mar. 27, 2015 in connection with International Application No. PCT/KR2015/000043; 4 pages.

* cited by examiner

SOCKET DEVICE

PRIORITY

The present application is related to and claims priority under 35 U.S.C. §119 an application filed in the Korean Intellectual Property Office on Jan. 13, 2014 and assigned Serial No. 10-2014-0003744, the contents of which are incorporated herein by reference.

TECHNICAL FIELD

The present disclosure relates to a socket device. More particularly, the present disclosure relates to a socket device received in an electronic device in order to receive an external device.

BACKGROUND

Electronic devices such as a mobile terminal evolve to provide wireless communication between users. As a technology makes progress, a mobile terminal provides lots of additional characteristics as well as simple telephone communication. For example, a mobile terminal can perform an alarm, a short messaging service, a multimedia messaging service, an e-mail, games, remote control of short distance communication, an image capture function using a mounted digital camera, a multimedia function providing audio and video contents, a scheduling function, a storing and authenticating function of receiving at least one card type external device to assist the above-described various functions.

A function of a portable electronic device is diversified, but a device which is advantageous in portability has higher competitiveness. For example, among portable electronic devices having the same function, a device having a slimmer and lightweight profile is preferred. Therefore, portable electronic device manufacturers make an effort in order to develop a device having a slimmer and lightweight profile compared to other products while having the same or superior function.

As a part of this trend, an electronic device has external devices selectively or essentially applied to the inside and these external devices are miniaturized gradually and an interface that may read these external devices is also miniaturized.

For example, for these external devices, a memory card that can extend a storage space of an electronic device, a Subscriber Identification Module card called a so-called 'SIM card' detachably installed so that a plurality of other authenticated users may use one electronic device, and the like are used. These external devices are generally configured in a card type so that it can be easily applied to a slim electronic device and it may minimize a detachment/attachment space. These external devices are mounted in a socket installed inside the electronic device via a slit disposed in a proper place of the device and recognized so that they are usable.

Therefore, for slimness of an electronic device, an installation structure of a socket for receiving an external device needs to be improved.

SUMMARY

Various embodiments of the present disclosure provide a socket device whose assembly structure is simple.

Various embodiments of the present disclosure provide a socket device that reduces the number of parts, reduces the number of assembly processes, and reduces manufacturing costs.

Various embodiments of the present disclosure provide a socket device implemented to contribute to slimness of an electronic device.

According to an aspect of the present disclosure, a socket device and an electronic device including the socket device are provided. The socket device includes a substrate. The socket device also includes at least one structure mounted on the substrate. The at least one structure comprising an upper surface including an opening separated with a predetermined interval from a surface of the substrate. The socket device further includes a socket installed in a way in which at least a portion of the socket is stacked on an upper portion of the structure. The socket is electrically connected to the substrate via the opening.

According to another aspect of the present disclosure, a socket device and an electronic device including the socket device are provided. The socket device includes a substrate. The socket device also includes at least one shield can mounted on the substrate. The at least one shield can comprising an upper surface including an opening separated with a predetermined interval from a surface of the substrate. The socket device further includes a socket including a socket cover, a socket base coupled with the socket cover to form a receiving space for receiving an external device, at least two tension ribs whose end protruding to the socket base is a hook shape, and a socket terminal body installed to the socket base and including one end exposed to the receiving space and including another end exposed to the socket base. The socket device includes a connector including a connector body fixed to the substrate, at least one connector terminal installed to the connector body and including one end electrically connected to the substrate and including another end exposed from the connector body, and a hooking recess formed such that an end of the tension rib inserted from the connector body via the opening is hooked at the hooking recess. The socket when mounted in the shield, the socket terminal body is electrically connected to the connector terminal via the opening so that the socket terminal body contacts the connector terminal.

Other aspects, advantages and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
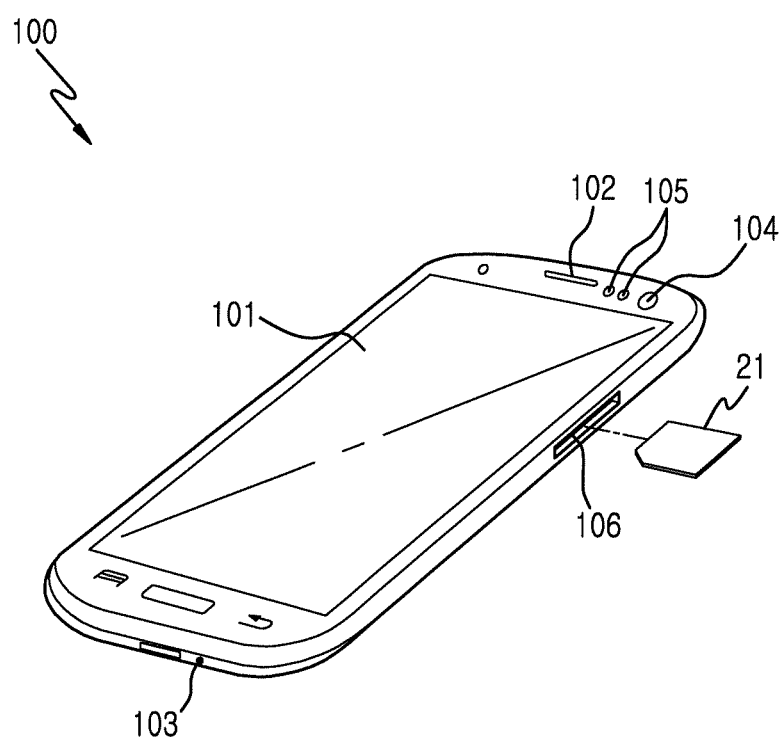
FIGS. 1 and 2 are configuration views illustrating an example electronic device including a socket device to which a card type external device is applied according to this disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, the present disclosure is described with reference to the accompanying drawings. The present disclosure may be changed variously and have various embodiments, and specific embodiments are exemplarily described and related detailed descriptions are made in the present specification. However, it should be understood that the various embodiments of the present disclosure are not limited to a specific embodied form and include all modifications and/or equivalents or substitutions that fall within the spirit and technical scope of the present disclosure. In the drawing, like reference numerals are used for like elements.

Expressions such as "include" or "may include", etc. that may be used for the present disclosure indicate existence of a disclosed relevant function, operation, or element, etc., and do not limit additional one or more functions, operations, or elements, etc. Also, it should be understood that terminologies such as "include" or "have", etc. are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

Expression such as "or", etc. in the present disclosure includes a certain and all combinations of words listed together. For example, "A or B" may include A and may include B, or include both A and B.

In the present specification, expressions such as "1st", "2nd", "first" or "second", etc. may modify various elements of the present disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the present disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

A terminology used in the present specification is used for explaining only a specific embodiment and is not intended for limiting the present disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the present disclosure belongs. It should be understood that generally used terminologies defined by a dictionary have meaning coinciding with meaning on context of a related technology, and unless clearly defined in the present specification, they are not understood as an ideal or excessively formal meaning.

An electronic device according to the present disclosure is a device including a communication function. For example, an electronic device includes at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (ex: a head-mounted-device (HMD) such as electronic glasses, an electronic clothing, an electronic bracelet, an electronic necklace, an electronic appcessory, an electronic tattoo, or a smartwatch).

According to certain embodiments, an electronic device is a smart home appliance having a communication function. A smart home appliance includes, for example, at least one of a television, a Digital Video Disk (DVD) player, an audio, a refrigerator, an air conditioner, a cleaner, an oven, an electronic range, a washing machine, an air purifier, a set-top box, a TV box (for example, Samsung HomeSync™, Apple TV™, or Google TV™), game consoles, an electronic dictionary, an electronic key, a camcorder, or an electronic frame.

According to certain embodiments, an electronic device includes at least one of various medical devices (ex: Magnetic Resonance Angiography (MRA), Magnetic Resonance Imaging (MRI), Computed Tomography (CT), a shooting device, an ultrasonic device, or the like), a navigation device, a Global Positioning System (GPS) receiver, an event data recorder (EDR), a flight data recorder (FDR), an automobile infotainment device, electronic equipment for a ship (ex: a navigation device for a ship, a gyro compass, or the like), an avionics, a security device, a head unit for a vehicle, a robot for an industrial use or a home use, an automatic teller machine of a financial institution, or a point of sales (POS) of a store.

According to certain embodiments, an electronic device includes at least one of a furniture or a portion of a building/structure including a communication function, an electronic board, an electronic signature receiving device, a projector, or various measurement devices (ex: waterworks, electricity, gas, or radio wave measuring device, or the like). An electronic device according to the present disclosure is a combination of one or more of the above-described devices. Also, an electronic device according to the present disclosure is a flexible device. Also, it is obvious to a person of ordinary skill in the art that the electronic device according to the present disclosure is not limited to the above-described devices.

Hereinafter, an electronic device according to various embodiments of the present disclosure is described with reference to the accompanying drawings. A terminology of a user used in various embodiments indicates a person who uses an electronic device or a device (ex: an artificial intelligence electronic device) that uses the electronic device.

In describing various embodiments of the present disclosure, a shield can has been described as a structure on which a socket is mounted, but the structure is not limited thereto. For example, the socket is installed in such a way that it is stacked on an upper portion of various structures provided to an electronic device. According to an embodiment, for this structure, not only a shield can but also various structures having height such as an antenna carrier on which an antenna radiator is mounted is applied.

In describing various embodiments of the present disclosure, a substrate is a rigid type. However, it is not limited thereto but is a flexible type Flexible Printed Circuit Board (FPCB). According to an embodiment, a substrate is a substrate where a rigid type and an FPCB are mixed. It is obvious that the technical spirit of the present disclosure is applied to a case where a shield can for shielding an electronic part is applied even though a substrate is not applied inside an electronic device.

In describing various embodiments of the present disclosure, for a card type external device, not only a Subscriber Identification Module (SIM) card (referred to as a 'SIM' card) but also an external device of various card types having a plurality of contact pads for connecting with a plurality of corresponding contact terminals of a socket installed inside the electronic device is applied. Therefore, it is obvious that various card type external devices such as a small-sized memory card, an ID card, or the like besides the SIM card is applied. However, it is not limited thereto, and in exemplary embodiments of the present disclosure, an external device not be a card type, and a socket device for receiving an external device even though the external device is not a card type is provided.

Figure 2:
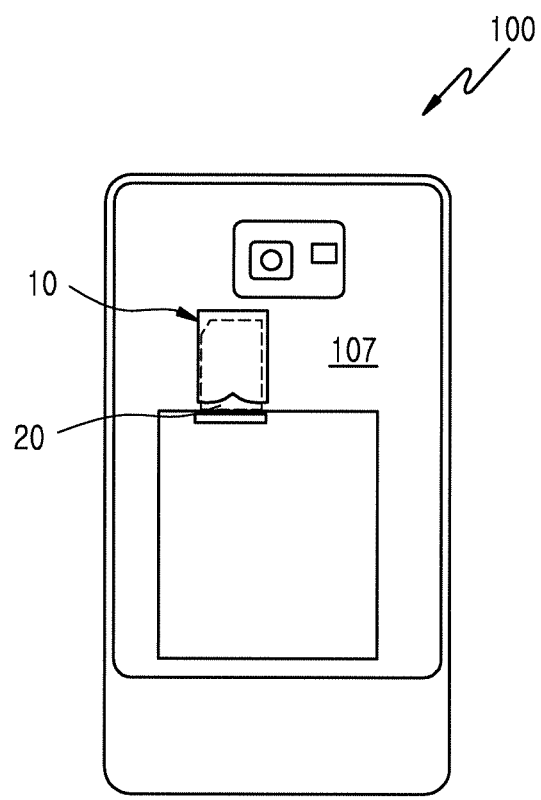

FIGS. 1 and 2 are configuration views illustrating an example electronic device including a socket device to which a card type external device is applied according this disclosure.

Referring to FIG. 1, a display device 101 is installed to a front side of the electronic device 100. For the display device 101, a Liquid Crystal Display (LCD) is provided. In this case, the display device 101 includes a controller for controlling an LCD, a video memory for storing image data, and an LCD element. When a touchscreen device is applied as the display device 101, the display device 101 performs all or a portion of an input function. The display device 101 is provided in an OLED display type or a certain different display type.

According to an embodiment, a microphone unit 103 for transmitting voice to a counterpart user is installed to the lower side of the display device 101, and a speaker unit 102 that receives a counterpart user's voice is installed to the upper side of the display device 101. A plurality of auxiliary devices 104 and 105 is installed in the neighborhood of the speaker unit 102. For example, in the case where a mobile terminal is applied as the electronic device 100, a camera module 104 for shooting an object, an illuminance sensor for sensing ambient brightness to adjust brightness of the display device 101, and a sensor module 105 such as a proximity sensor for turning off a display screen during communication is installed as these auxiliary devices.

According to an embodiment, a slot 106 of a predetermined length is formed in a lateral side of the electronic device 100. The slot 106 receives a card type external device 20' so that it is selectively detachable. According to an embodiment, the card type external device 20' is a memory card used as an auxiliary storage means of the electronic device. According to an embodiment, the card type external device 20' is an ID card that provides authentication information for a user of the electronic device. According to an embodiment, an ID card is a SIM card or a UIM card. Though described below, the electronic device 100 has a socket device 10 (of FIG. 3) according to various embodiments of the present disclosure in an inner region of the electronic device 100 corresponding to the slot 106. According to an embodiment, the socket device includes a socket 13 (of FIG. 3) for receiving the card type external device 20'.

Referring to FIG. 2, a card type external device 20 is also installed to a backside 107 of the electronic device 100. That is, a socket device 10 is disposed on the backside 107 of the electronic device 100, and the card type external device 20 is inserted to the socket device 10.

According to various embodiments, as illustrated in FIGS. 1 and 2, the card type external devices 20' and 20 include a plurality of contact pads exposed on the outer surface of the card type external devices, and is implemented such that when they are inserted to the socket of the socket device 10, they are physically connected to corresponding contact terminals inside the socket to perform a relevant operation.

A conventional socket device has been configured such that a socket is directly mounted on a substrate in a Surface Mounted Device (SMD) method, and receives a card type external device received via the corresponding slot 106 of the electronic device. However, this method causes installation limitation of a neighboring electronic function group on a substrate, and a separate socket installation space should be prepared on the substrate. Consequently, the volume of an electronic device has indispensably increased.

However, according to various embodiments of the present disclosure, the socket device 10 is applied in a way in which the socket device 10 is stacked on the upper portion of various structures received in the inside of the electronic device 100. Therefore, a separate space of the substrate for socket installation is excluded, and another electronic part is mounted in this space to increase a functional element of the electronic device, or the relevant space is excluded and an area of the substrate is reduced, so that slimness of the electronic device is achieved.

Hereinafter, a socket device according to various embodiments of the present disclosure is described in detail.

Figure 3:
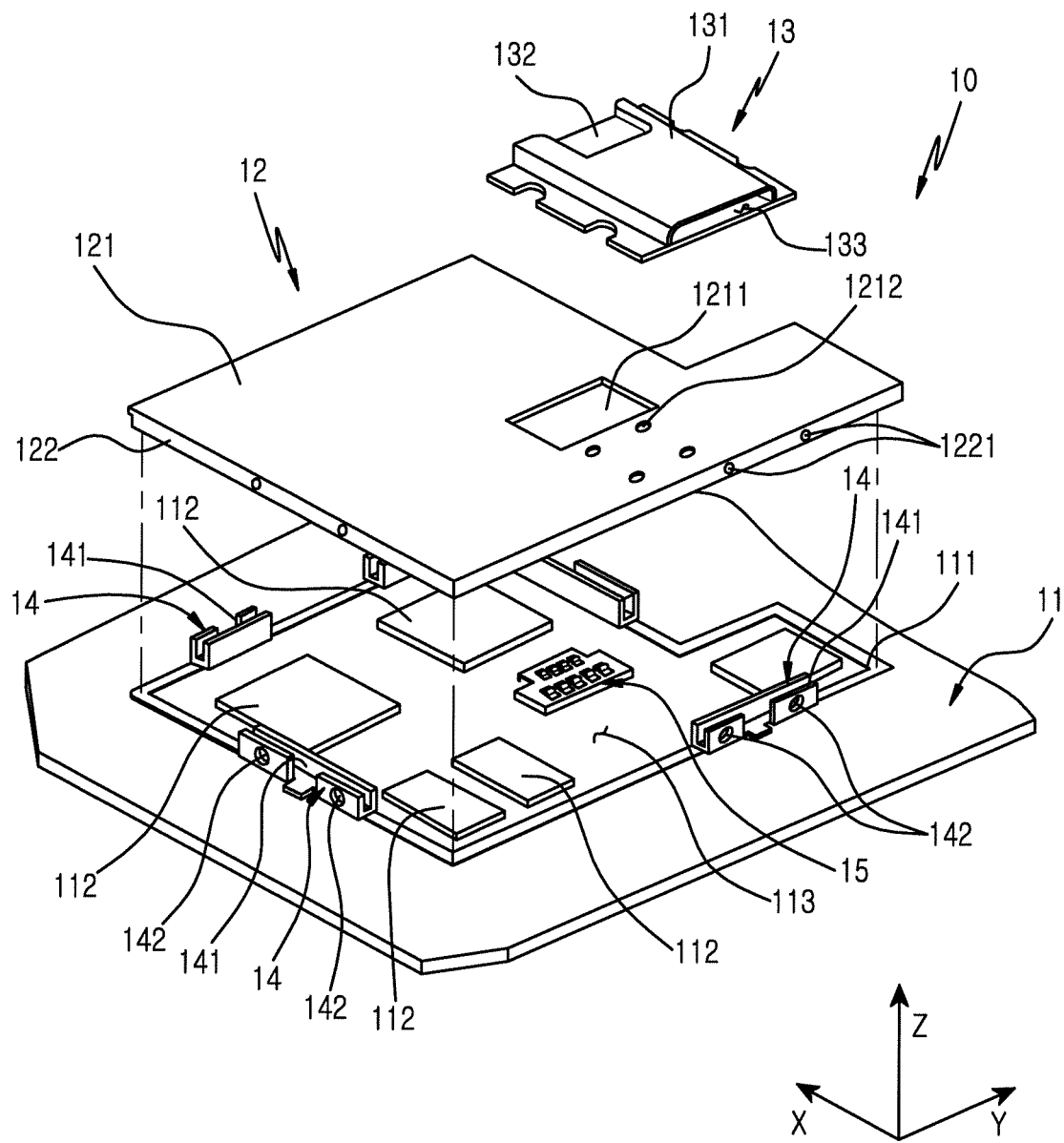
FIG. 3 is a separated perspective view illustrating an example socket device according to this disclosure.

FIG. 3 is a separated perspective view illustrating an example socket device according to this disclosure.

According to various embodiments of the present disclosure, the socket device 10 includes a substrate 11, a shield can 12 applied as an exemplary embodiment of a structure mounted on the substrate 11, and a socket 13 stacked on the upper portion of the shield can 12.

According to an embodiment, the substrate 11 includes a grounding line 111 for forming an electronic part receiving region 113 where a plurality of electronic parts 112 are mounted. According to an embodiment, the grounding line 111 formed in or installed to the substrate 11 is disposed such that it is exposed on the upper surface of the substrate 11, and is electrically connected with a grounding portion (not shown) of the substrate 11. The grounding line 111 forms a closed region corresponding to an edge of the shield can 12 disposed on the grounding line 111. Therefore, when the shield can 12 is mounted on the substrate 11, the edge of the shield can 12 is installed such that it contacts the grounding line 111.

According to an embodiment, the shield can 12 includes an upper surface 121 formed in at least same size as the electronic part receiving space 113, and a lateral surface 122 bent from the upper surface 121 along the edge to provide a predetermined height. Therefore, a space formed by the upper surface 121 and the lateral surface 122 of the predetermined height is applied as a receiving space 113 for receiving electronic parts 112 when the shield can 12 is fixed to the substrate 11.

According to an embodiment, the shield can 12 is formed of metal. According to an embodiment, the shield can 12 is formed of a conductive metal material such as SUS, aluminum, or the like In this case, the upper surface 121, the lateral surface 122, and a tension protrusion 1221 which will be described later is integrally formed via a process such as pressing, injection molding, or the like According to an embodiment, the electronic device 100 includes a fixing means that fixes the shield can 12 to the substrate 11. For this fixing means, a fixing clip 14 that tightly receives the lateral surface 122 of the shield can 12 is used. The fixing clip 14 is formed in a shape obtained by bending a metal plate many times, and fixed among the grounding line 111 of the substrate 11. To tightly receive the lateral surface 122 of the shield can 12, the fixing clip 14 includes a lateral insert portion 141 whose upper direction is open. According to an embodiment, the at least one tension protrusion 1221 formed on the lateral surface 122 of the shield can 12 is inserted to a tension hole 142 formed in the lateral insert portion 141 of the fixing clip 14 in a forcibly fitting manner, so that consequently the shield can 12 is fixed to the substrate 11 solidly without detachment. According to an embodiment, the fixing clip 14 is formed of metal, and fixed to the grounding line 111 of the substrate 11 via a process such as soldering, bonding, or the like According to an embodiment, an opening 1211 of a predetermined size is formed in the upper surface of the shield can 12. According to an embodiment, the opening 1211 serves as an electrical connection path for the socket 13 disposed on the opening 1211. According to an embodiment, at least one support hole 1212 is formed within an installation region of the socket 13 excluding the opening 1211 in the upper surface of the shield can 12. According to an embodiment, support holes 1212 are formed in four places with a constant interval, and induces the socket 13 to be installed to an accurate region of the upper surface 121 of the shield can 12 in such a way that corresponding support protrusions that projects from a socket base of the socket 13 which will be described later are inserted to the support holes 1212, and even after installation, the support holes 1212 prevents the socket from arbitrarily moving in x-axis and y-axis directions on the upper surface of the shield. According to an embodiment, the support hole is formed such that it passes through the upper surface of the shield, or formed in a recess that does not pass through the upper surface.

According to an embodiment, the socket 13 includes a socket cover 131 and the socket base 132 coupled to the socket cover 131. The socket cover 131 is formed of metal material such as SUS, and the socket base 132 is formed of a synthetic resin material. According to an embodiment, the socket cover 131 is coupled at least partially to the socket base 132 by insert molding. According to an embodiment, the socket cover 131 and the socket base 132 is coupled to each other by mechanical coupling structure (for example, a snap fit structure, or the like) instead of the insert molding. According to an embodiment, an insert space 133 for receiving a card type external device 20 and 20' is formed by coupling of the socket cover 131 and the socket base 132. Hereinafter, specific construction of the socket 13 is described later in detail.

According to an embodiment, a connector 15 is installed to the upper surface of the substrate 11 corresponding to the socket 13 and the opening 1211 of the shield can 12. The connector 15 is fixed to the substrate 11, and electrically connected with a control circuit for performing a corresponding function of a card type external device of the substrate 11. According to an embodiment, a plurality of corresponding connector terminals protrudes on the upper surface of the connector 15.

According to various embodiments, the shield can 12 is fixed to the substrate 11 in such a way that the edge of the shield can 12 is seated in the lateral insert portion 141 of the fixing clip 14 along the grounding line 111 of the substrate 11. At this point, the opening 1211 formed in the upper surface 121 of the shield can 12 and the connector 15 installed to the substrate 11 is disposed at positions corresponding to each other.

According to an embodiment, the socket 13 is installed to the upper surface 121 of the shield can 12 assembled to the substrate 11. At this point, a connector contact terminal exposed on the surface of the socket base 132 of the socket 13 physically contacts a connector terminal of the connector 15 via the opening 1211, so that the connector contact terminal is electrically connected to the connector terminal. By this connection structure of the socket 13, a separate mounting region for the socket is excluded in the substrate 11, and since electric connection is performed via the opening 1211, an FPC of an excessive length or a separate auxiliary substrate for detouring the shield can 12 is not required.

In the above exemplary embodiment, one shield can has been applied as a structure, but two or more shield cans installed in a related manner is applied simultaneously. According to an embodiment, in this case, the socket is installed such that it shares at least a portion of at least two shield cans.

According to various embodiments, positions of the opening 1211, the connector 15, and the support hole is changed and disposed in FIG. 3.

Figure 4A:
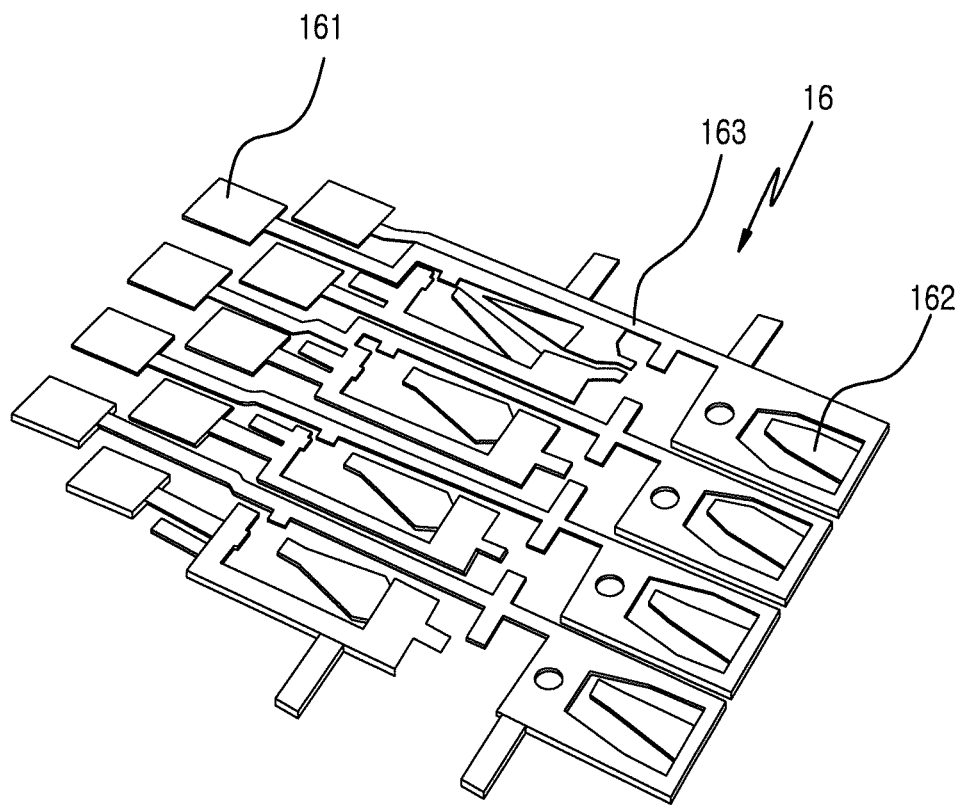
FIGS. 4A to 4D are partial configuration views illustrating an example socket device according to this disclosure.
Figure 4B:
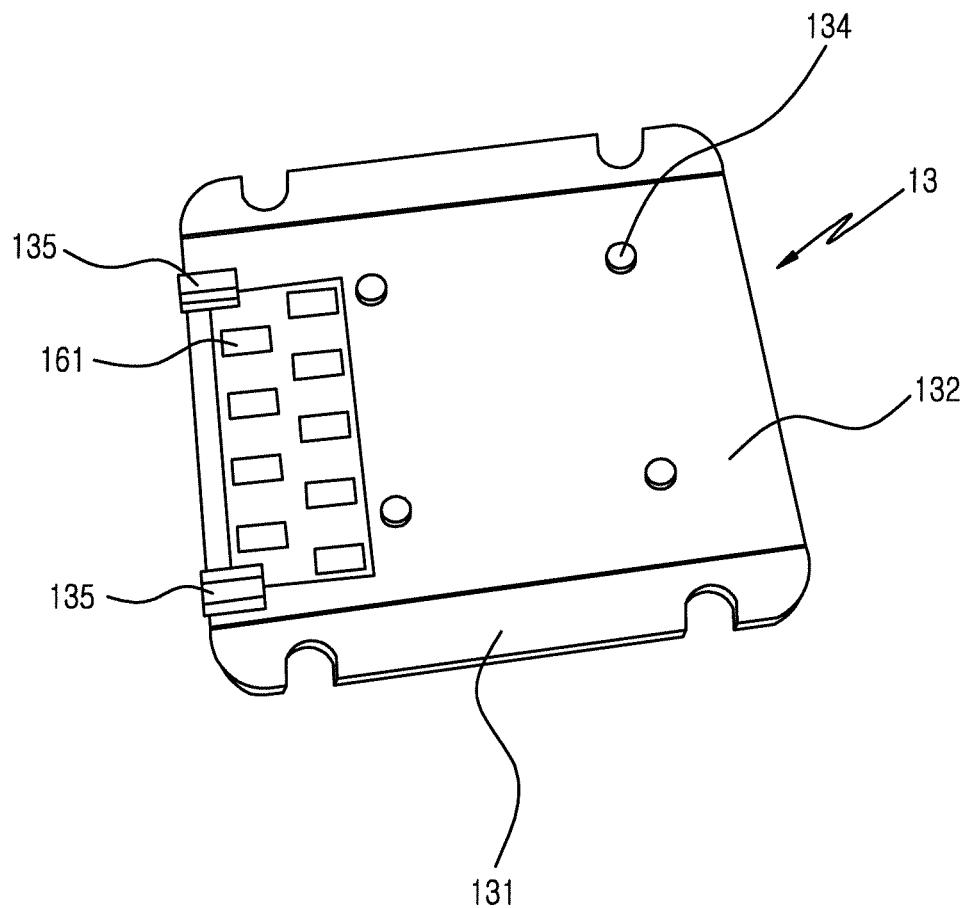
Figure 4C:
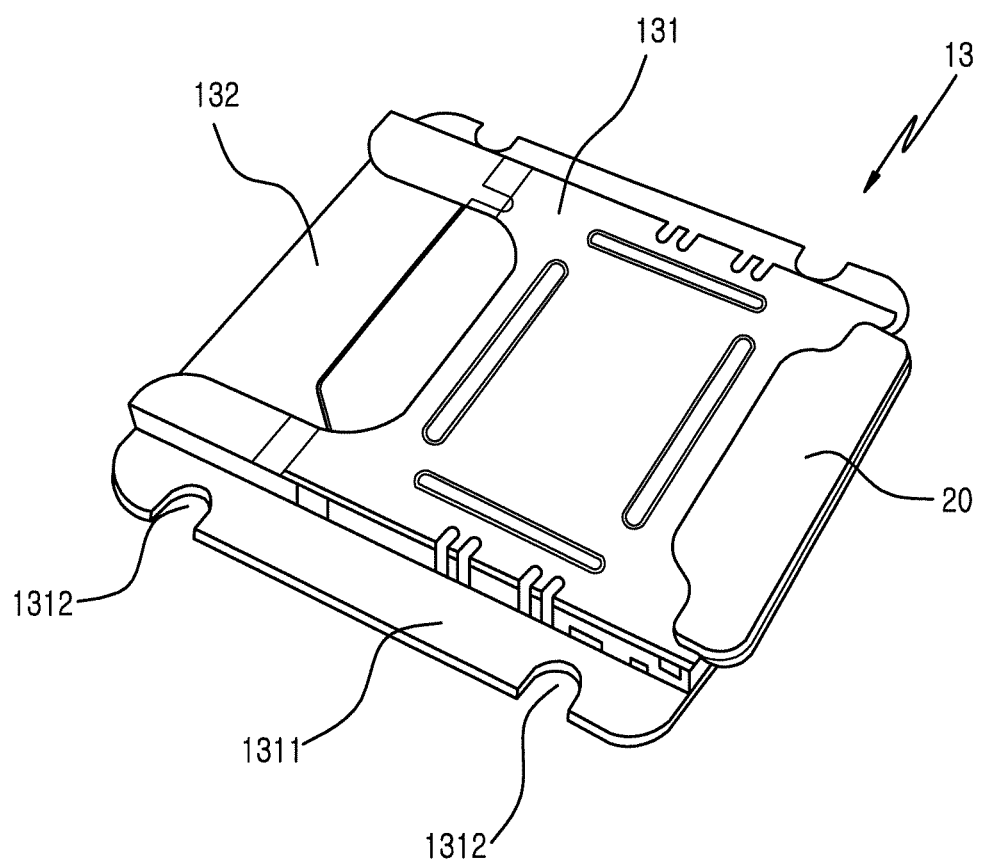
Figure 4D:
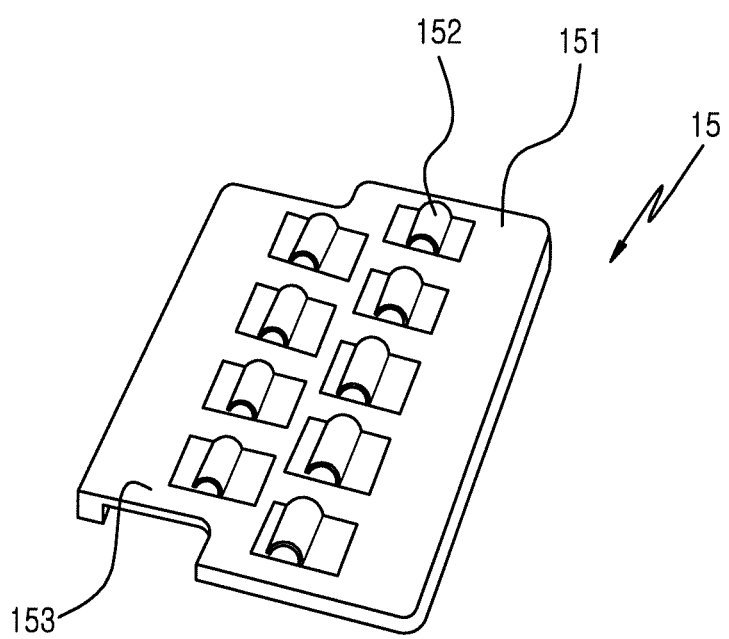

FIGS. 4A to 4D are partial configuration views illustrating an example socket device according to an embodiment of the present disclosure. FIG. 4A is a view illustrating an example socket terminal body of metal material applied to a socket base of a socket. FIG. 4B is a backside perspective view of an example socket illustrating a state where a socket terminal body has been applied to a socket base. FIG. 4C is a front perspective view of an example socket. FIG. 4D is a perspective view of an example connector.

Referring to FIGS. 4A and 4B, the socket terminal body 16 is formed of metal. The metal terminal body 16 includes a connection portion 163 of a predetermined length. A plurality of connector contact terminals 161 is formed at one end of the connection portion 163, and a card contact terminal 162 is formed at the other end of the connection portion 163. According to an embodiment, the socket terminal body 16 is fixed to the socket base 132 of a synthetic resin material in an insert molding method.

According to an embodiment, the connector contact terminal 161 is disposed such that it is exposed to the outer surface of the socket base 132 and connected with a connector terminal 152 (of FIG. 4D) of a connector 15 (of FIG. 4D) which is described herein. Therefore, for sufficient contact with the connector terminal 152, the connector contact terminal 161 is formed to have a sufficient large contact area. According to an embodiment, the card contact terminal 162 is installed such that it is exposed or protruded in a receiving space 133 for card reception formed by coupling of the socket cover 131 and the socket base 132. Therefore, the card contact terminal 162 has a construction that contacts card terminals exposed to a corresponding area of a card type external device when the card type external devices 20 and 20' are inserted to the receiving space 133.

According to an embodiment, at least two tension ribs 135 protruding with a predetermined length is formed on the socket base 132. An end portion of the tension rib 135 is formed in a hook shape, and has a construction hooked at a hooking recess 153 formed in a body 151 (of FIG. 4D) of the connector 15 which will be described later. According to an embodiment, the tension rib 135 is configured so that the socket 13 is hooked at the hooking recess 153 of the connector 15 via the opening 1211 of the shield can 12.

Referring to FIG. 4C, a flange 1311 horizontally bent to the outside is further formed on both sides of the socket cover 131. The flange 1311 may not only provide an extended fixing surface for more stably fixing the socket 13 to the shield can 12 but also further include a fixing structure for preventing the mounted socket 13 from arbitrarily moving to an x-axis, a y-axis, and a z-axis in advance. According to an embodiment, at least one concave recess 1312 is formed in the flange 1311, and the flange 1311 plays a guiding role for screw coupling described later via the concave recess 1312. According to an embodiment, the concave recess 1312 receives a moving prevention protrusion that protrudes on a corresponding position on the upper surface of the shield can.

Referring to FIG. 4D, the connector 15 fixed to the substrate 11 includes a connector body 151 of a predetermined shape and a plurality of connector terminals 152 protruding from the connector body 151. According to an embodiment, the connector body 151 is formed of a synthetic resin, and the connector terminal 152 of metal material is fixed to the connector body 151 in the insert molding method. According to an embodiment, a hooking recess 153 for receiving the tension rib 135 protruding on the above-described socket base 132 is formed in one side of the connector body 151. The hooking recess 153 allows the tension rib 135 to be hooked, so that in the case where the socket 13 is assembled to the shield can 12, a temporary assembled state is maintained constantly, or complete detachment of the socket 13 from the shield can 12 due to deterioration of adhesive force of a double-sided tape interposed between the socket 13 and the shield can 12 is prevented.

Figure 5A:
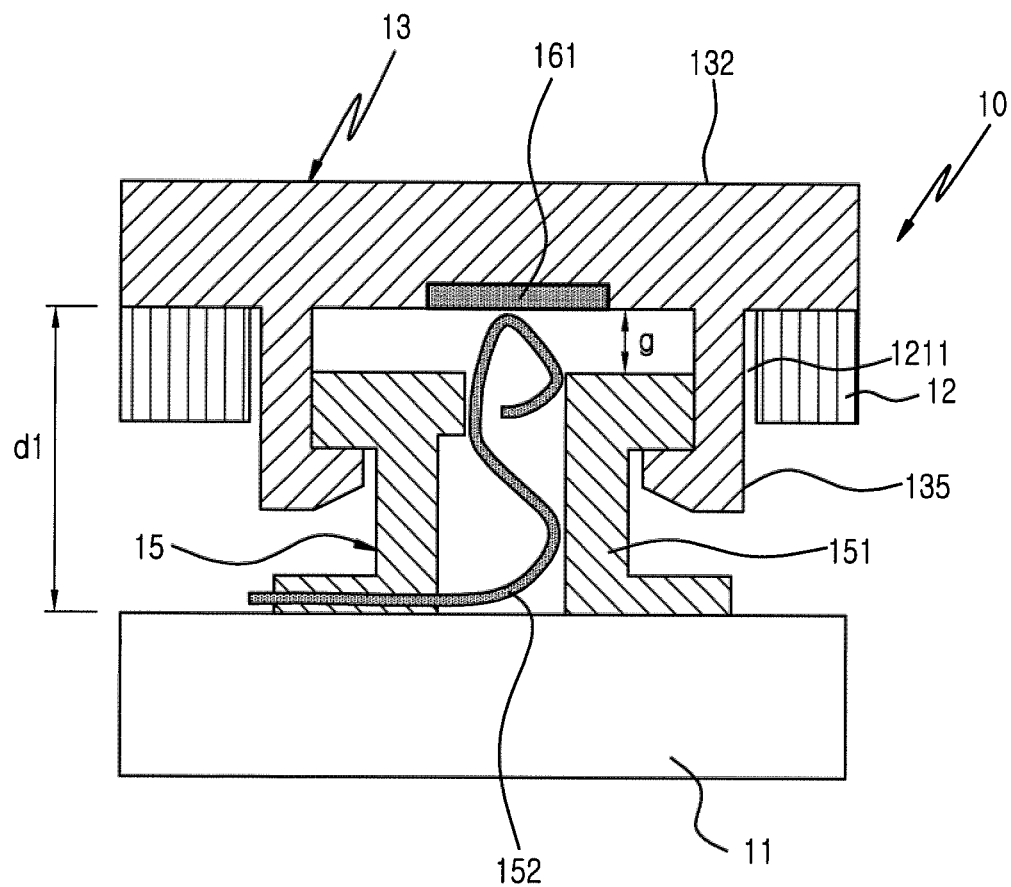
FIGS. 5A and 5B are cross-sectional views of a crucial portion illustrating a coupled state of an example socket device according to this disclosure.
Figure 5B:
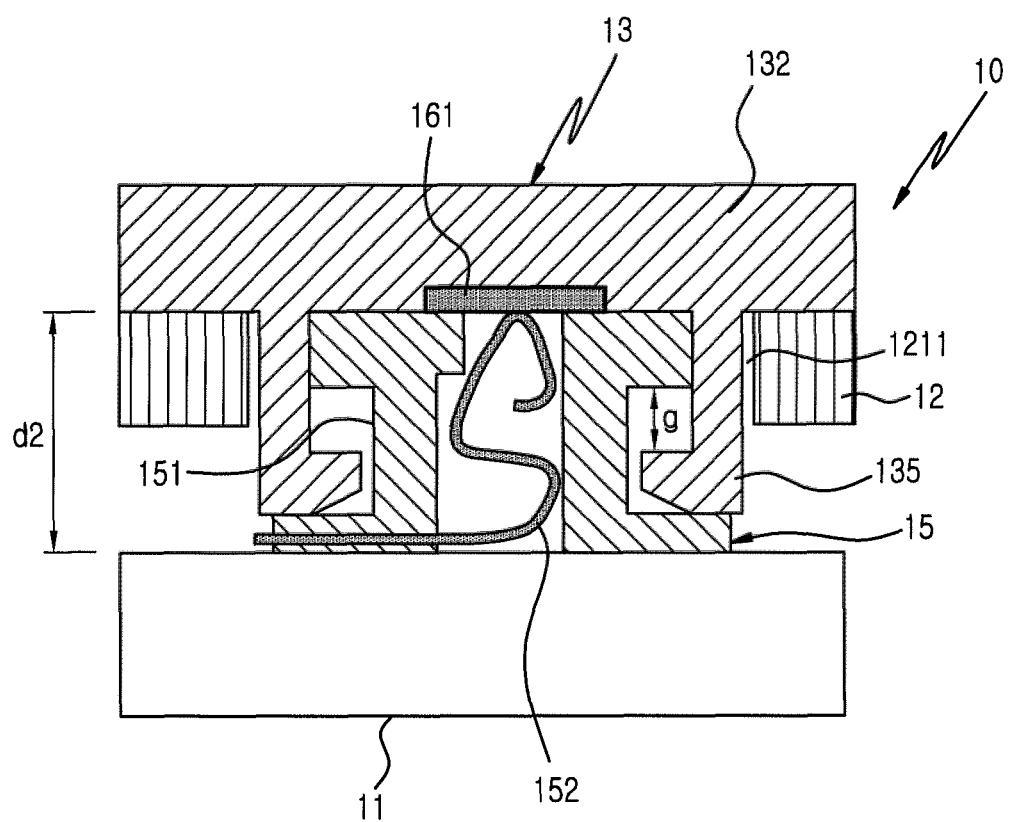

FIGS. 5A and 5B are cross-sectional views of a crucial portion illustrating a coupled state of an example socket device according to this disclosure. FIGS. 5A and 5B illustrate a connection structure in the case where heights of shield cans are different from each other. In both cases, when a tension rib of a socket is hooked at a hooking recess of a connector and once coupled to the hooking recess, it is not detached to the outside.

Referring to FIGS. 5A and 5B, a hook-shaped end portion of the tension rib 135 protruding from the socket base 132 is hooked at the hooking recess 153 of the connector 15, so that the socket 13 is fixed to the upper surface of the shield can 12. In this case, even when the shield cans have different installation heights d1 and d2, a variable section g is provided, so that the socket 13 is installed to the upper surface of the shield can 12.

Referring to FIG. 5A, the socket 13 is pressurized upward by elasticity of the connector terminal 152 installed to the connector 15 even though the socket 13 has the variable height g, so that the socket 13 and the connector 15 is connected with a gap between the socket 13 and the connector 15 maintained.

Referring to FIG. 5B, the connector terminal 152 installed to the connector 15 is electrically connected with the socket 13 even though the socket 13 has this variable height g. In this case, a separate fixing means is required so that the socket 13 may not be pushed upward by elasticity of the connector terminal 152.

Figure 6A:
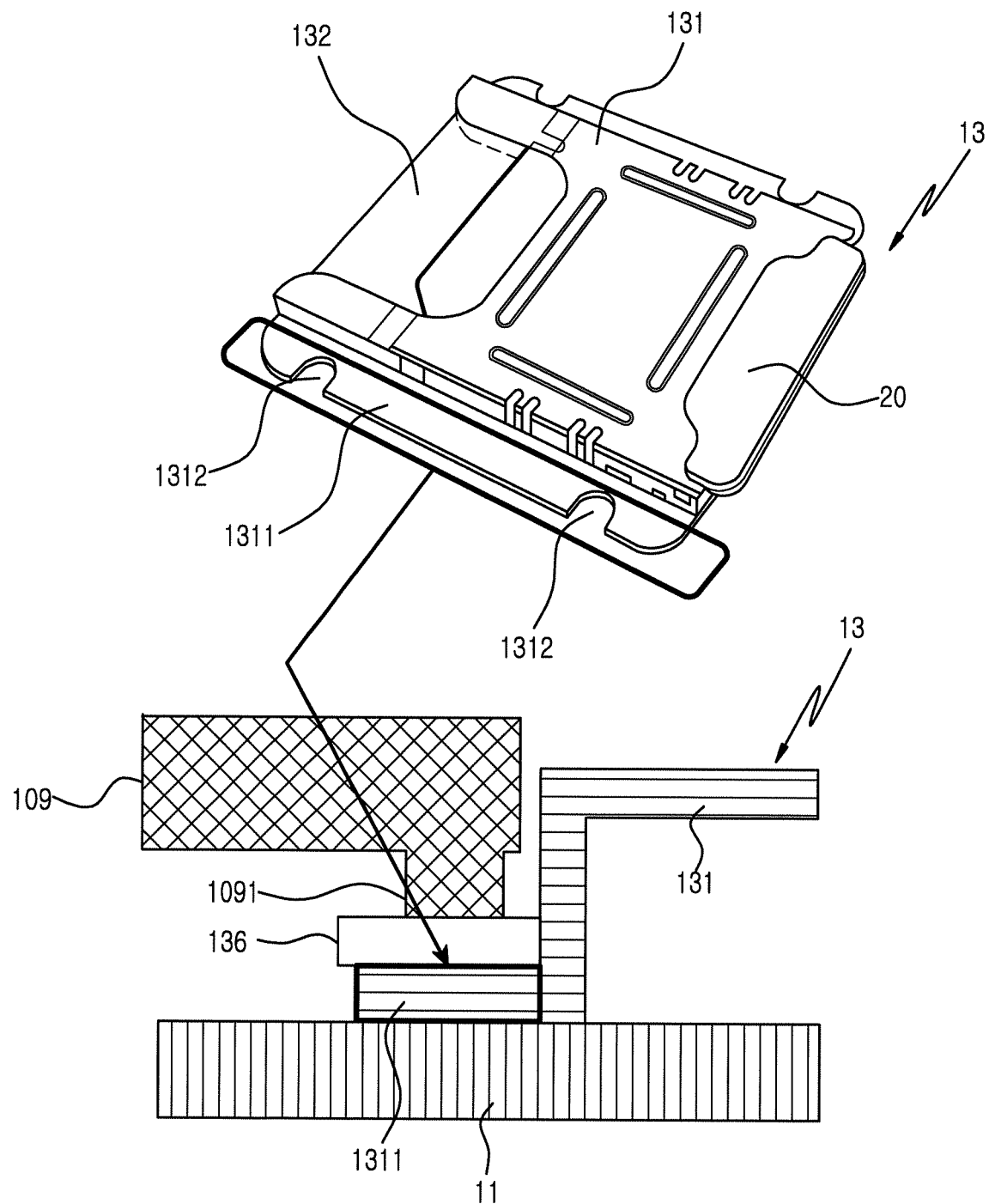
FIGS. 6A to 6C are configuration views illustrating example configurations for supporting a socket in a z-axis direction according to this disclosure.
Figure 6B:
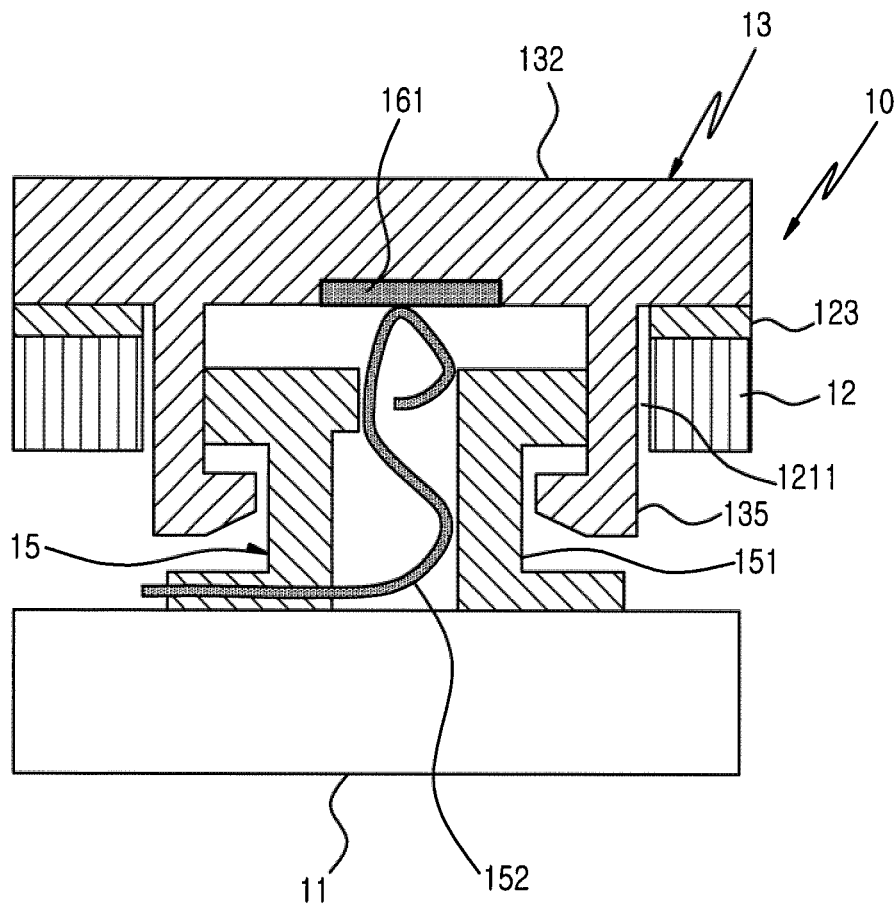
Figure 6C:
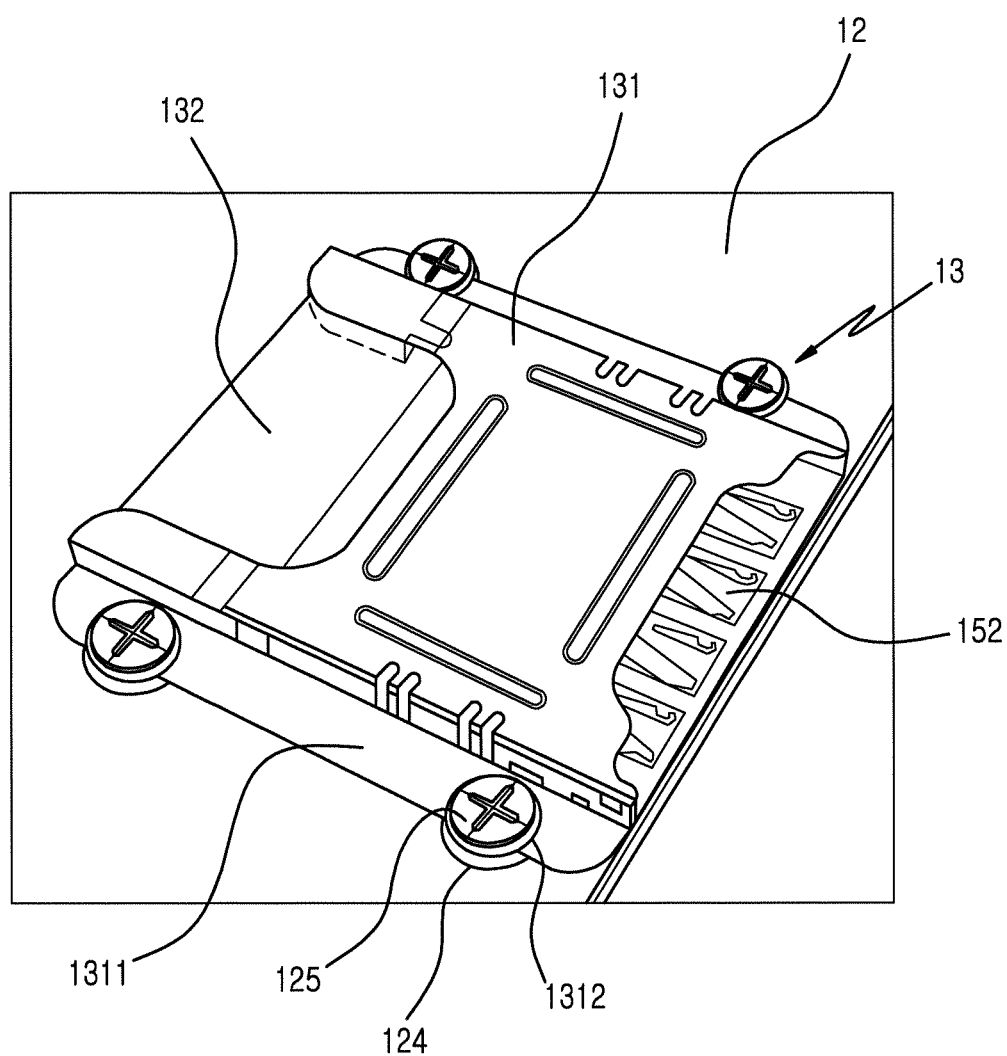

FIGS. 6A to 6C are configuration views illustrating configuration for supporting an example socket in a z-axis direction according to this disclosure.

According to various embodiments of the present disclosure, the socket is fixed to the shield can with only an operation of allowing the tension rib formed on the socket to be hooked at the hooking recess of the connector, but to prevent the shield can from moving in a z-axis direction in advance after assembly, an auxiliary fixing structure is further included. This movement prevention structure according to various embodiments of the present disclosure is described below.

Referring to FIG. 6A, a horizontally bent flange 1311 extends on both sides of the socket cover 131 of the socket 13. In the case where the socket 13 is fixed to the shield can 12, this flange 1311 plane-contacts the upper surface of the shield can 12. When a case frame 109 of the electronic device is assembled on the upper portion of the flange, the case frame 109 is configured to pressurize the flange 1311 in a z-axis direction. According to an embodiment, a pressurize protrusion 1091 extends from the case frame 109 in a flange direction, and the flange 1311 is additionally pressurized in the z-axis direction by this pressurize protrusion 1091, so that moving of the socket 13 in the z-axis direction is prevented. According to an embodiment, an intervening means 136 is further interposed between the pressurize protrusion 1091 and the flange 1311. The intervening means 136 is used for preventing external impulse of the electronic device from being directly transferred to the flange 1311, and pressurizing the flange 1311 solidly. According to an embodiment, for the intervening means 136, a sponge, a poron tape, a non-woven fabric, or the like is used.

Referring to FIG. 6B, after the tension rib 135 of the socket 13 is hooked at the hooking recess 153 of the connector 15 fixed to the substrate 11 and so first temporary assembly is completed, a double-sided tape 123 is applied between the backside of the socket 13 and the upper surface of the shield can 12, so that the socket 13 is finally fixed to the substrate 11. According to an embodiment, the double-sided tape 123 is applied to only the flange 1311 of the socket cover 131. According to an embodiment, the double-sided tape 123 is applied to not only the flange 1311 but also all portions except the connector contact terminal 161 of the socket base 132. According to an embodiment, since the socket 13 and the shield can 12 should be insulated, it is more preferable to apply a double-sided tape of insulating soft material to the latter case. In this case, the socket 13 is attached to the shield can 12 by the double-sided tape 123, so that moving of the socket 13 in a z-axis direction is prevented.

Referring to FIG. 6C, the socket 13 is fastened using a screw 125 via the concave recess 1312 of the flange 1311 with a pem nut 124 press-fitted on the upper surface of the shield can 12, so that moving of the socket 13 to a z-axis direction is prevented. According to an embodiment, the socket 13 is fastened to the upper surface of the shield can 12 of metal material via the concave recess 1312 of the flange 1311 using a self-drilling screw (such as a so-called 'giri piece') without a separate pem nut.

According to an embodiment, the movement prevention structure to the z-axis direction can be individually applied or simultaneously applied.

Figure 7:
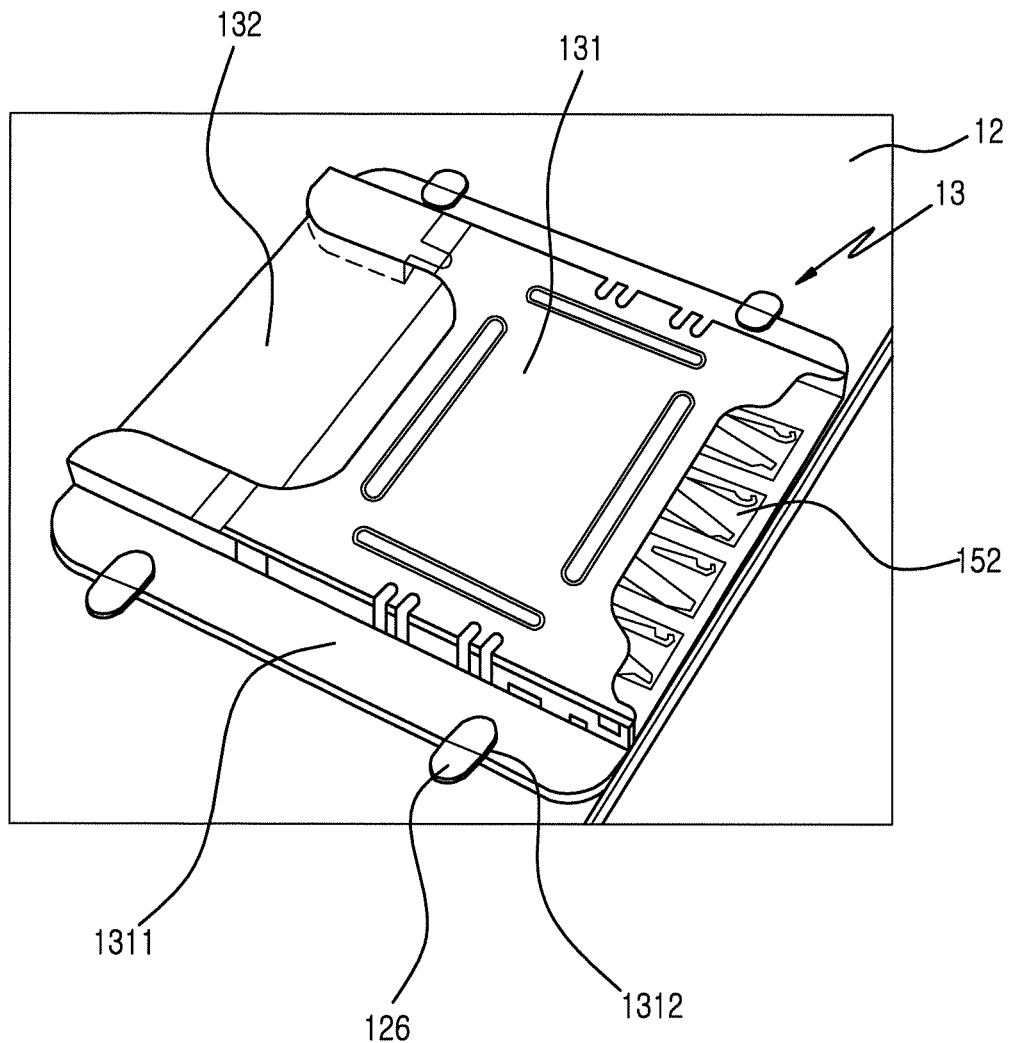
FIG. 7 is a configuration view illustrating example configurations for supporting a socket in an x-axis direction and a y-axis direction according to this disclosure.

FIG. 7 is a configuration view illustrating an example configuration for supporting a socket in an x-axis direction and a y-axis direction according to this disclosure.

According to various embodiments of the present disclosure, the socket is fixed to the shield can with only an operation of allowing the tension rib formed on the socket to be hooked at the hooking recess of the connector, but to prevent the shield can from moving in an x-axis direction and a y-axis direction in advance after assembly, a movement prevention structure is further included.

As illustrated in FIGS. 3 and 4B, this movement prevention structure is accomplished by a coupling structure of at least one support hole 1212 formed in the upper surface 121 of the shield can 12 and a support protrusion 134 protruding at a corresponding position of the socket base 132 and inserted to the support hole 1212 when the socket 13 is mounted.

According to an embodiment, as illustrated in FIG. 7, this movement prevention structure is accomplished by a way in which a movement prevention protrusion 126 protruding on the upper surface of the shield can 12 is hooked at the concave recess 1312 formed in the flange 1311 of the socket 13.

Also, this movement prevention structure in an x-axis direction and a y-axis direction is individually applied or simultaneously applied.

Figure 8:
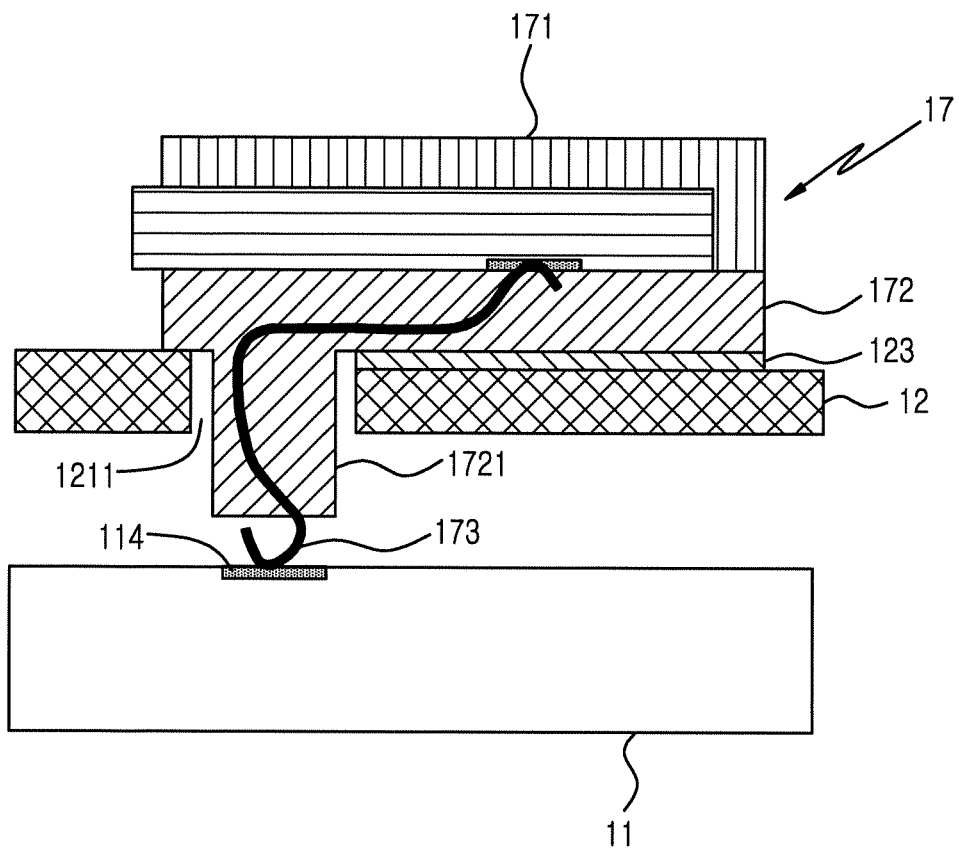
FIG. 8 is a cross-sectional view of a crucial portion illustrating a coupled state of an example socket device according to this disclosure.

FIG. 8 is a cross-sectional view of a crucial portion illustrating a coupled state of a socket device according to an embodiment of the present disclosure. FIG. 8 illustrates configuration where even a leading-in protrusion 1721 drawn from a socket 17 exposes a socket terminal body 173, so that the socket terminal body 173 is electrically connected directly to a substrate terminal of a substrate.

Referring to FIG. 8, the socket 17 includes a socket cover 171 and a socket base 172 coupled to the socket cover 171. The socket base 172 is formed of a synthetic resin and can include a leading-in protrusion 1721 protruding downward by at least a height of a shield can 12. According to an embodiment, the socket base 172 and the leading-in protrusion 1721 are integrally formed, and the socket terminal body 173 is fixed by insert molding from the socket base 172 to the leading-in protrusion 1721. One end of the socket terminal body 173 is disposed such that it is exposed or projected from the socket base 172 to the inside of a card receiving space formed by the socket cover 171, and the other end is disposed such that it is projected the lower portion of the leading-in protrusion 1721.

According to an embodiment, when the socket 17 is mounted on the upper surface of the shield can 12, the leading-in protrusion 1721 is inserted such that it passes through the opening 1211 of the shield can 12, and the socket terminal body 173 exposed from the lower portion of the leading-in protrusion 1721 physically contacts a substrate terminal 114 of a substrate 11 to perform electric connection.

According to an embodiment, though not shown, after the socket 17 is mounted, the above-described movement prevention structures for preventing the socket 17 from moving in the shield can 12 in an x-axis direction, a y-axis direction, and a z-axis direction is individually or simultaneously applied.

Figure 9:
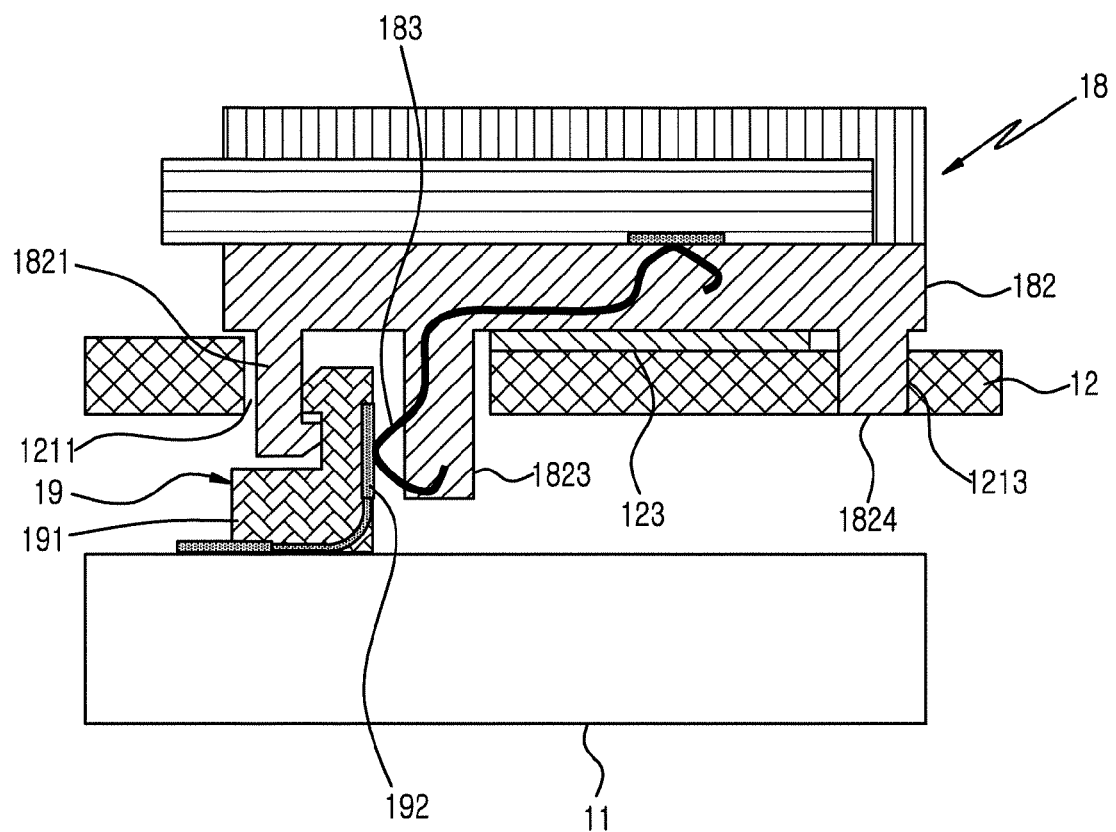
FIG. 9 is a cross-sectional view of a crucial portion illustrating a coupled state of an example socket device according to this disclosure.

FIG. 9 is a cross-sectional view of a crucial portion illustrating a coupled state of an example socket device according to this disclosure. FIG. 9 is a view illustrating an example socket is disposed on the upper surface of a shield can and a connection structure to an x-axis direction and or a y-axis direction has been applied to exclude repulsive force with which a connector terminal of a connector pushes a socket terminal body in a z-axis direction.

Referring to FIG. 9, a connector terminal 192 of a connector 19 mounted on the substrate 11 is disposed such that it is exposed to the lateral side via a connector body 191. At this point, like the case of FIG. 8, a leading-in protrusion 1823 drawn downward from a socket base 182 of a socket 18 is disposed such that it also protrudes a lateral direction from one end of a socket terminal body 183. Therefore, when the socket 18 is mounted on the upper surface of the shield can 12, the leading-in protrusion 1823 is inserted such that it passes through via the opening 1211 of the shield can 12, and the socket terminal body 183 exposed to the lateral side of the leading-in protrusion 1823 is electrically connected with the connector terminal 192 exposed on the lateral side of the connector 19. Simultaneously, the socket 18 is fixed to the shield can in such a way that the tension rib 1821 protruding from the socket base 182 is hooked at a hooking recess formed in the connector 19 via the opening 1211, so that movement of the socket in a z-axis direction is prevented.

According to an embodiment, at least one support protrusion 1824 protruding from the socket base 182 is inserted to a support hole 1213 of the shield can 12, so that movement of the socket in an x-axis direction and a y-axis direction is prevented.

According to an embodiment, an insulating double-sided tape 123 is interposed between the backside of the socket base 182 and the upper surface of the shield can 12, so that movement of the socket 13 in a z-axis direction is prevented.

Figure 10:
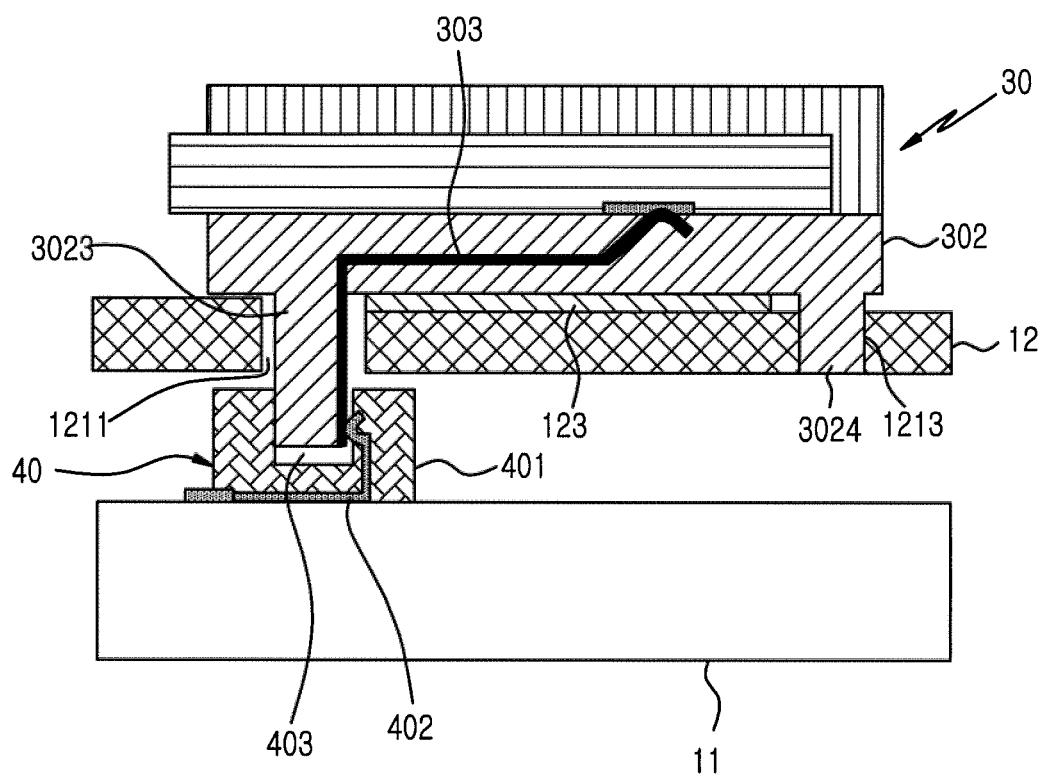
FIG. 10 is a cross-sectional view of a crucial portion illustrating a coupled state of an example socket device according to this disclosure.

FIG. 10 is a cross-sectional view of a crucial portion illustrating a coupled state of an example socket device according to an embodiment of the present disclosure. FIG. 10 is a view also illustrating a socket is disposed on the upper surface of a shield can and a connection structure to an x-axis direction and or a y-axis direction has been applied to exclude repulsive force with which a connector terminal of a connector pushes a socket terminal body in a z-axis direction.

According to an embodiment, unlike FIG. 9, FIG. 10 illustrates the connector is implemented in a shape enclosing a leading-in protrusion.

Referring to FIG. 10, a connector terminal 402 of a connector 40 mounted on the substrate 11 is disposed such that it protrudes to an inner surface of a protrusion introduce recess 403 formed in the upper portion of a connector body 401. At this point, like the case of FIG. 9, a leading-in protrusion 3023 drawn downward from a socket base 302 of a socket 30 is also disposed such that one end of a socket terminal body 303 is exposed to a lateral direction. Therefore, when the socket 30 is mounted on the upper surface of the shield can 12, the leading-in protrusion 3023 is inserted such that it passes through via the opening 1211 of the shield can 12, and is partially inserted to a protrusion introduction recess 403 of a connector body 401, and simultaneously the socket terminal body 303 exposed to the lateral side of the leading-in protrusion 3023 is electrically connected with a connector terminal 402 protruding on the inner surface of the protrusion introduction recess 403 of the connector 40.

According to an embodiment, at least one support protrusion 3024 protruding from the socket base 302 is inserted to a support hole 1213 of the shield can 12, so that movement of the socket in an x-axis direction and a y-axis direction is prevented.

According to an embodiment, an insulating double-sided tape 123 is interposed between the backside of the socket base 302 and the upper surface of the shield can 12, so that movement of the socket 30 in a z-axis direction is prevented.

According to various embodiments of the present disclosure, the number of parts is reduced, so that the number of assembly processes is reduced and assembling is convenient, and manufacturing costs is reduced and slimness of an electronic device is achieved.

Although the disclosure has been shown and described with reference to certain preferred embodiments thereof, it will be understood by those skilled in the art that various changes in form and details is made therein without departing from the spirit and scope of the disclosure as defined by the appended claims. Therefore, the scope of the present disclosure should not be limited to the above-described embodiments but should be determined by not only the appended claims but also the equivalents thereof.

What is claimed is:

1. A socket device comprising:
   a substrate;
   at least one structure disposed on the substrate and comprising an upper surface, the upper surface comprising an opening separated by a predetermined interval from a surface of the substrate;
   a socket disposed so that at least a portion of the socket is stacked on the upper surface of the structure, wherein the socket includes a socket terminal body installed in the socket; and
   a connector disposed on the substrate and configured to contact the socket terminal body to perform electric connection via the opening when the socket is mounted on the structure,
   wherein the connector comprising:
   a connector body fixed to the substrate; and
   at least one connector terminal installed to the connector body, wherein the at least one connector terminal comprises a first connector terminal end electrically connected to the substrate, and wherein the at least one connector terminal comprises a second connector terminal end exposed from the connector body.

2. The socket device of claim 1, wherein the socket comprises:
   a socket cover; and
   a socket base coupled to the socket cover forming a space to receive an external device,
   wherein the socket terminal body comprises a first end exposed to the space, and wherein the socket terminal body comprises a second end exposed to the socket base.

3. The socket device of claim 2, wherein at least two tension ribs protrude in a socket mount direction and comprise a tension rib end portion, wherein the tension rib end portion comprises a hook shape formed on the socket base, and a hooking recess at which the tension rib end is hooked is formed on the connector body.

4. The socket device of claim 3, wherein when the socket is mounted on the structure, the tension rib is hooked at the hooking recess so that the tension rib passes through the opening.

5. The socket device of claim 2, wherein the socket is fixed between the socket base and an upper surface of the structure using an insulating double-sided tape.

6. The socket device of claim 2, wherein at least one support protrusion protrudes on the socket base and is received in a corresponding support hole formed in the structure to impede the socket from moving in a z-axis direction.

7. The socket device of claim 2, wherein flanges are further formed in a horizontal direction on both sides of the socket cover or the socket base.

8. The socket device of claim 7, wherein the socket is fixed to the structure using a double-sided tape applied to the flange or the socket base so that movement of the socket in a z-axis direction is impeded.

9. The socket device of claim 7, wherein the socket is fixed to pressurize an upper portion of the flange by a case frame of a device to which the socket device is applied so that movement of the socket in a z-axis direction is impeded.

10. The socket device of claim 7, wherein at least one concave recess is formed in the flange, and the socket is fixed to the structure by a screw fastened via the concave recess so that movement of the socket in a z-axis direction is impeded.

11. The socket device of claim 7, wherein at least one concave recess is formed in the flange, and the concave recess receives a movement prevention protrusion protruding on an upper surface of the structure to impede the socket from moving in an x-axis direction or a y-axis direction.

12. The socket device of claim 1, wherein the structure is at least one shield can disposed inside an electronic device to which the socket device is applied.

13. The socket device of claim 1, wherein the socket comprises:
    a socket cover;
    a socket base coupled to the socket cover to form a space to receive an external device;
    a leading-in protrusion extending downward from the socket base and inserted to the opening when the socket is mounted on the structure; and
    a socket terminal body installed to the socket base, wherein the socket terminal body comprises a first end exposed to the space, and wherein the socket terminal body also comprises a second end exposed to a backside of the leading-in protrusion.

14. The socket device of claim 13, wherein when the socket is mounted on the structure, the socket terminal body exposed to the leading-in protrusion contacts a substrate terminal of the substrate so that an electrical connection is performed.

15. The socket device of claim 1, wherein the socket comprises:
    a socket cover;
    a socket base coupled to the socket cover to form a space to receive an external device;
    a leading-in protrusion extending downward from the socket base and inserted to the opening when the socket is mounted on the structure; and
    a socket terminal body disposed to the socket base, wherein the socket terminal body comprises a first end exposed to the receiving space, and wherein the socket terminal body comprises a second end exposed to a lateral side of the leading-in protrusion.

16. The socket device of claim 15, wherein a connector comprising a connector terminal is further installed to the substrate, and when the socket is mounted on the structure, the socket terminal body of the leading-in protrusion inserted via the opening contacts the connector terminal in an x-axis direction or a y-axis direction.

17. An electronic device comprising a socket device, the socket device comprising:
a substrate;
at least one structure disposed on the substrate comprising an upper surface, the upper surface comprising an opening separated by a predetermined interval from a surface of the substrate;
a socket disposed so that at least a portion of the socket is stacked on the upper surface of the structure, wherein the socket includes a socket terminal body installed in the socket; and
a connector disposed on the substrate and configured to contact the socket terminal body to perform electric connection via the opening when the socket is mounted on the structure,
wherein the connector comprises:
a connector body fixed to the substrate; and
at least one connector terminal installed to the connector body, wherein the at least one connector terminal comprises a first connector terminal end electrically connected to the substrate, and wherein the at least one connector terminal comprises a second connector terminal end exposed from the connector body.

18. A socket device comprising:
a substrate;
at least one shield can disposed on the substrate and comprising an upper surface, the upper surface comprising an opening separated by a predetermined interval from a surface of the substrate;
a socket comprising:
a socket cover,
a socket base coupled to the socket cover to form a space to receive an external device,
at least two tension ribs each comprising a tension rib end protruding to the socket base in a hook shape, and
a socket terminal body disposed to the socket base, wherein the socket terminal body comprises a first end exposed to the space and a second end exposed to the socket base; and
a connector comprising:
a connector body fixed to the substrate,
at least one connector terminal disposed to the connector body, wherein the at least one connector terminal comprises a first connector terminal end electrically connected to the substrate and a second connector terminal end exposed from the connector body, and
a hooking recess formed such that the tension rib ends inserted from the connector body via the opening are hooked at the hooking recess,
wherein when the socket is disposed in the shield can, the socket terminal body is electrically connected to the connector terminal via the opening so that the socket terminal body contacts the connector terminal.

* * * * *